United States Patent [19]

Flamm et al.

[11] Patent Number: 4,581,735

[45] Date of Patent: Apr. 8, 1986

[54] LOCAL AREA NETWORK PACKET PROTOCOL FOR COMBINED VOICE AND DATA TRANSMISSION

[75] Inventors: Lois E. Flamm, Chatham Township, Morris County; John O. Limb, Berkeley Heights, both of N.J.

[73] Assignee: AT&T Bell Laboratories, Murray Hill, N.J.

[21] Appl. No.: 499,291

[22] Filed: May 31, 1983

[51] Int. Cl.[4] .......................... H04J 3/02; H04J 1/16; H04Q 11/04
[52] U.S. Cl. ...................................... 370/85; 370/16; 370/60; 370/88
[58] Field of Search .................. 370/85, 60, 94, 110.1, 370/16, 88; 340/825.5

[56] References Cited

U.S. PATENT DOCUMENTS

| | | | |
|---|---|---|---|
| 3,851,104 | 11/1974 | Willard et al. | 370/85 |
| 4,063,220 | 12/1977 | Metcalfe et al. | 370/85 |
| 4,161,786 | 7/1979 | Hopkins et al. | 370/85 |
| 4,210,780 | 7/1980 | Hopkins et al. | 370/85 |
| 4,360,910 | 11/1982 | Segal et al. | 370/85 |
| 4,412,326 | 10/1983 | Limb | 370/85 |
| 4,439,763 | 3/1984 | Limb | 340/825.5 |
| 4,450,554 | 5/1984 | Steensma et al. | 370/80 |
| 4,476,559 | 10/1984 | Brolin et al. | 370/110.1 |
| 4,503,533 | 3/1985 | Tobagi et al. | 370/85 |

OTHER PUBLICATIONS

Ser. No. 399,428, filed 7/19/82, Flores et al.
Proceedings Computer Network Protocols Symposium, Feb. 13-15, 1978, "The Mininet Inter-Node Control Protocol", R. C. S. Morling et al., pp. B4-1-B4-6.
Proceedings of the Local Area Communications Network Symposium, May 1979, "Multimode Communications on the MITRENET", G. T. Hopkins, pp. 169-177.
EEM Electron Eng Mas, 1980/81, vol. 2, 1980, "Directional Couplers", as Manufactured by Mini-Circuits, pp. 3112-3115.
Performance of Data Communication Systems and Their Applications, Pujolle, Sep. 1981.

(List continued on next page.)

*Primary Examiner*—Douglas W. Olms
*Assistant Examiner*—Curtis Kuntz
*Attorney, Agent, or Firm*—Richard J. Roddy; Henry T. Brendzel

[57] ABSTRACT

In order to control the transfer of packets of information among a plurality of stations, the instant communications system, station and protocol contemplate first and second oppositely directed signal paths. At least two stations are coupled to both the first and the second signal paths. A station reads one signal from a path and writes another signal on the path. The one signal is read by an arrangement which electrically precedes the arrangement for writing the other signal. Packets are transmitted in a regular, cyclic sequence. A head station on a forward path writes a start cycle code for enabling each station to transmit one or more packets. If a station has a packet to transmit, it can read the bus field of a packet on the forward path. Responsive thereto, a logical interpretation may be made as to whether the forward path is busy or is not busy. If the path is not busy, the packet may be written on the path by overwriting any signal thereon including the busy field. If the path is busy, the station may defer the writing until the path is detected as not busy.

In order to accommodate different types of traffic, the head station may write different start cycle codes. For example, a start-of-voice code may enable stations to transmit voice packets; a start-of-data code may enable stations to transmit data packets, etc. for the different types of traffic. Further, the start cycle codes may be written in a regular, e.g., periodic, fashion to mitigate deleterious effects, such as speech clipping. Still further, the last station on the forward path may write end cycle codes in packets on a reverse path for communicating control information to the head station. Responsive to the control information, the head station may modify the cycle to permit the respective stations to, for example, transmit more than one packet per cycle or to vary the number of packet time slots, which are allocated to each of the different types of traffic.

24 Claims, 8 Drawing Figures

OTHER PUBLICATIONS

Local Networks & Distributed Office Systems, Hopkins, 1981.
The Express-Net: A Local Area Communication Network Integrating Voice and Data, Dec. 1980, Tobagi.
Computer Network Protocols, Morling et al., Feb 1978.
Globecom '82, IEEE, vol. 1.
Local Area Communications Network, Meisner & Rosenthal, May 1979.
Directional Couplers, ZFDC Series, 1980.
Map: An Insertion Protocol etc., Marsan and Albertengo, Apr. 1981.

LOCAL AREA NETWORK PACKET PROTOCOL FOR COMBINED VOICE AND DATA TRANSMISSION

TECHNICAL FIELD

This invention relates to communication systems and, more particularly, to multiple access digital communications systems as well as to stations and protocols for use therein.

BACKGROUND OF THE INVENTION

In the early days of the telephone art, use of the telephone was often confined to communications among users within a local geographic area. As a result and over the years, the economies related to accessing a communications system have lead to telephones in a local area usually being interconnected through a central controller, often called a local central office in the art.

As digital computers came upon the scene, another local community of use became discernible. Hence, a central controller is commonly employed for interconnecting various user terminals. For example, U.S. Pat. No. 3,851,104; entitled "Digital Communications System" and issued Nov. 26, 1974; discloses a time division, multiple access communication system which, under the control of a central terminal, provides communication links among a plurality of user terminals by way of a single communications signal path.

As the digital computer art advanced, parallel advances in the semiconductor art have lead to smaller, relatively inexpensive computers. With the advent of such smaller computers, the technique of central computer control is being abandoned in favor of a distributed control technique. Also, because of the usually bursty nature of digital information, the recent trend has also been toward communications systems having a capability for handling packets of digital information. One such communications system, which may be of a type commonly referred to as a local area network, is disclosed in a copending application by C. F. Flores et al, i.e., Ser. No. 399,428, entitled "Collision Avoiding System and Protocol for a Two Path Multiple Access Digital Communications System", and filed July 19, 1982, which application is herein incorporated by reference and which application discloses a collision avoiding communications system which system contemplates a communications loop having first and second oppositely directed unidirectional communications signal paths. Each of at least two stations such as a digital computer may be coupled to both the first and the second paths. A station may write a first packet signal on the first path and read a second packet signal from the second path. A station may also read a third packet signal from the first path. The arrangement for reading the third signal may be electrically preceding the arrangement for writing the first signal on the first path. A station may also write a fourth packet signal on the second path. The arrangement for writing the fourth signal may be electrically succeeding the arrangement for reading the second signal on the second path. In response to the first, second, third and fourth signals, the communications system through its stations and protocol avoids collisions on the communications paths. Its protocol contemplates that a busy field of a packet may indicate that a respective path is either busy or not busy. If the path is not busy, the station may write a packet on the path. If the path is busy, the station may overwrite the busy control field for indicating that the station has a packet to transmit and that it is contending for the path.

Of concern here is the design of a local area network for the transmission of mixtures of various traffic types such as, for example, mixtures of voice traffic, video traffic and facsimile traffic as well as digital computer data traffic. Clearly, it is desirable to permit different types of traffic to be efficiently combined on one system. This presents a challenge because the different types of traffic have different characteristics.

SUMMARY OF THE INVENTION

It is toward solving that challenge that the principles of our invention are directed. Our collision avoiding communication system, station and protocol contemplate first and second oppositely directed signal paths. At least two stations are coupled to both the first and the second signal paths. A station read one signal from a path and writes another signal on the path. The one signal is read by an arrangement which electrically precedes the arrangement for writing the other signal. Packets may be transmitted in a regular, cyclic sequence. A head station on a forward path writes a start cycle code for enabling each station to transmit one or more packets. The start cycle code identifies a type of traffic which may be written by a station in a packet on the forward path. For example, a start-of-voice code may enable stations to transmit voice packets; a start-of-data code may enable stations to transmit data packets; et cetera, for the different types of traffic. Stations on the forward path read the start cycle code and, responsive thereto, are initialized for writing the type of traffic identified by the start cycle code. If a station has a packet to transmit, it can read the busy field of a packet on the forward path. Responsive thereto, a logical interpretation may be made as to whether the forward path is busy or is not busy. If the path is not busy, a packet of the initialized type may be written on the path by overwriting any signal thereon including the busy field. If the path is busy, the station may defer the writing until the path is detected as not busy. The electrically last station on the forward path reads the start cycle field and the busy field and, in response thereto, writes a predetermined end cycle code in an end cycle field of a packet on a reverse path, thereby extending control information to the head station. In response to the control information, the head station may write a different start cycle code for enabling the stations to transmit a different type of traffic.

BRIEF DESCRIPTION OF THE DRAWING

The invention should become fully apparent when taken in connection with the following detailed description and accompanying drawing in which.

DETAILED DESCRIPTION

Figure 1:
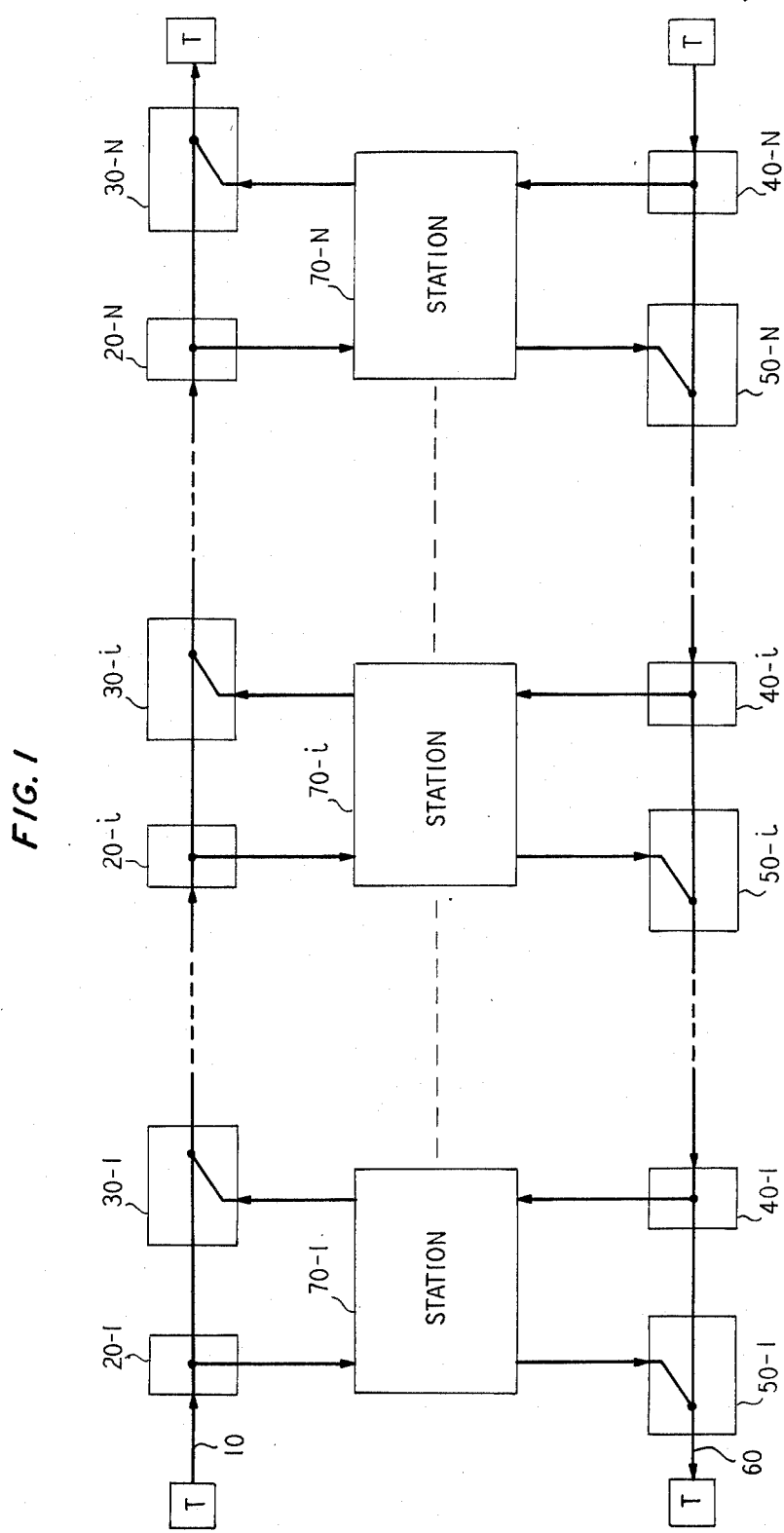
FIG. 1 illustrates an arrangement including a plurality of stations interconnected with two oppositely directed unidirectional communications paths, which arrangement is useful in describing the principles of the invention.

Before more particularly describing an illustrative embodiment of the principles of our invention, let us mention some, but not all, of the different characteristics as between, for example, voice traffic and data traffic. Studies have shown that voice packets are usually generated at a constant rate and during the time a person is talking. For the integrity of the conversation, the voice packets would be delivered with a maximum time delay which is comparable to the time period between generation of consecutive voice packets. Experience has shown that from one to two percent of all voice packets can be lost without introducing serious degradation to the conversation. Further, it is acceptable, on occasion, to prevent a telephone voice call from being completed (i.e. blocking the call). However, once a call is established, it should be possible to continue the call to completion. Still further, telephone voice traffic has both a coarse structure and a fine structure. The coarse structure is associated with the origination and termination of the individual calls, which typically last about three minutes. The fine structure is associated with the talk spurts and the interlaced silent intervals which are characteristic of a typical telephone conversation. Since a telephone user tends to talk about forty percent of the time, the efficiency of a system can be more than doubled by not transmitting a signal during the silent intervals. There are known time assignment speech interpolation (TASI) systems which capitalize upon that characteristic.

Data packets, on the other hand, are usually generated in bursts. For example, data packets may occur in bursts of about 100 milliseconds followed by idle times measured in seconds or minutes. Hence, data packets tend to result in low average bit-rates. In many cases, a delay of 100 or 200 milliseconds does not present a problem with a data packet. However, experience has shown that error rates approaching zero are desirable and that data packets which are lost often introduce serious degradation to the data communications process.

Now to an illustrative embodiment of the principles of our invention. Referring to the illustrative structure shown in FIG. 1, which also appears in the aforecited Flores et al patent application, a first unidirectional communications signal path 10 is there illustrated as extended through a plurality of cascaded transmission couplers such as passive read coupler 20-$i$ and passive writer couplers 30-$i$. A second unidirectional signal path 60, which path is oppositely directed with respect to first path 10, is also there illustrated as extended through another plurality of cascaded transmission couplers such as passive read coupler 40-$i$ and passive writer coupler 50-$i$. Thus, each of stations 70-1 through 70-N is twice coupled to each of the two oppositely directed communications paths. Further, station 70-1 is called the head station and station 70-N is called the last station, respectively, with respect to path 10. Conversely, station 70-1 is the last station and station 70-N is the head station, respectively, with respect to path 60. Still further, when station 70-1 is the head station, path 10 is called the forward path while path 60 is called the reverse path. Conversely, when station 70-N is the head station, path 10 is called the reverse path while path 60 is called the forward path.

More particularly, on the one hand, nondirectional read couplers 20-$i$ and 40-$i$ are for electrically coupling signals, which are detected on a respective first 10 or second 60 communications path to station 70-$i$. In that manner, station 70-$i$ may monitor or read or receive signals on both the first path and the second path. On the other hand, directional write couplers 30-$i$ and 50-$i$ are for coupling or inserting or writing or transmitting signals from station 70-$i$ onto the respective communications path. For example, the inserted signal could, responsive to a signal being priorly read from path 10 through the electrically preceding nondirectional read coupler 20-$i$, overwrite the first path signal through directional write coupler 30-$i$, e.g., by the energy of write signal being electrically added to the signal, if any, already on path 10. In parallel fashion, the inserted signal could, responsive to a signal being priorly read from path 60 through electrically preceding nondirectional read coupler 40-$i$, overwrite the second path signal through write coupler 50-$i$. In that manner, station 70-$i$ may transmit a signal by causing the signal to be inserted or written on the communications path. As should be clear from FIG. 1, there are actually two transmit sides and two receive sides of the communications system. For example, as to station 70-$i$ transmitting a packet, the packet would be transmitted on communications path 10 if the packet is destined to be received by station 70-$k$ where k is greater than i. On the other hand, if the packet is destined to be received by station 70-$j$ where j is less than i, the packet would be transmitted on communication path 60.

We now make some assumptions to aid in a description of an illustrative embodiment of the principles of our invention. These assumptions are useful in illustrating the principles and are not by way of limitation.

Firstly, assume that a synchronization signal has been transmitted from the respective head station on the respective forward paths 10 and 60 for bit and data synchronizing each station. For example, the synchronization signal disclosed in the Flores patent application could be used.

Figure 2:
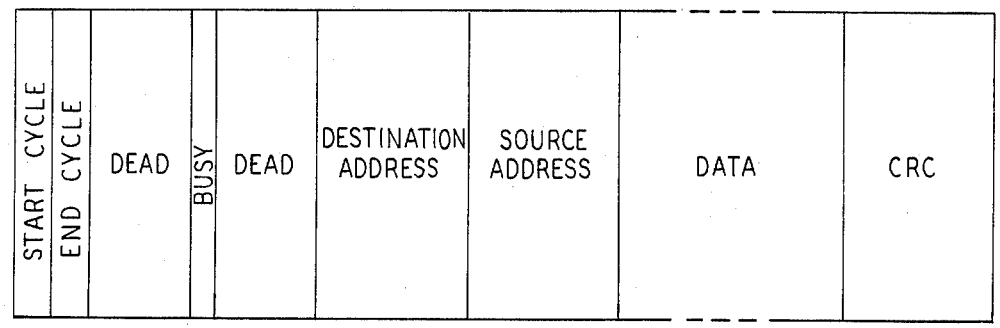
FIG. 2 illustrates a multifield packet useful in describing the principles of the invention.

Secondly, assume that each path shown in FIG. 1 is capable of transmitting signals at a rate of 10 megabits per second and further that speech (or voice) packets will be transmitted in 10 millisecond packets. If speech is coded at a rate of 64 kilobits per second, then we assume that each 10 millisecond packet will include a data field containing 640 bits. In addition to a data field, we also assume that each packet contains an access control field including an additional 60 bits for communicating control information on the path, for addressing stations, for error correcting function(s), et cetera. For example, referring to FIG. 2, for illustration, a packet is assumed to include an access control field, which field in turn includes one or more subfields, each subfield including one or more bits. Here, the access control field of an illustrative packet includes the subfields labelled start cycle, end cycle, dead, and busy, respectively. In addition, the access control field includes a destination station address subfield, a source station address subfield, and an error control subfield. One error control subfield may also include a well known cyclic redundancy code (CRC).

Thirdly, assume that a packet may be read from or written into a time slot of a time division multiplexed signal on the path.

Fourthly, assume that each of the N stations may transmit a packet during a predetermined time frame, which time frame is herein referred to as a cycle. As should be clear, station 70-N would not typically transmit a packet on path 10 while, conversely, station 70-1 would not transmit a packet on path 60. Thus only (N−1) stations would transmit on a respective path. Notwithstanding, the preceding assumption is useful in describing an illustrative embodiment of the principles of our invention. Accordingly, in one illustrative embodiment, a cycle may include up to M packets. That is, there may be M time slots in the predetermined time frame comprising a cycle. Indeed a cycle may include (M=)N packets or, alternatively, more or less than N packets. In any event the first packet in a cycle would have its start cycle subfield set to one of a plurality of prefixed logic values, herein also identified as a start cycle code or START code, by the head station on the respective path. Responsive to detecting and interpreting each respective START code, the respective stations on the path are adapted to function in accord with our herein described protocol.

Fifthly, although the principles of our invention apply to other types of traffic, we assume only two types of traffic, i.e., either voice traffic or data traffic. Cycles are initiated by the respective head station (here station 70-1 for path 10 and station 70-N for path 60) writing a "start-of-voice" code (START=V) or a "start-of-data" code (START=D) in the start cycle field. Parenthetically, the words field and subfield are used interchangeably herein. In general, all other packets in the cycle would have their respective start cycle field set to a logic zero (i.e. START=0). Responsive to the detection of a START=V code in the start cycle field, each respective station in the path may be initialized to transmit one type of traffic and, in so doing, may set a respective "permit register" (also called a p-register) to a logic one for indicating that the station may transmit a packet, here a voice packet. After a station has transmitted a voice packet, the station resets its permit register to a logic zero for indicating that the station may not transmit a voice packet. Alternatively, each station might have two permit registers, one p-register being related to transmitting on path 10 and the second p-register being related to transmitting on path 60. Further, since speech samples are assumed to be transmitted in 10 millisecond packets, a start-of-voice code is written in the start cycle field by the respective head station at 10 millisecond intervals to regularly initiate a voice cycle. Since the communications paths are assumed to operate at 10 megabits per second and since the time interval between consecutive voice packets is assumed to be a 10 millisecond time interval and since each packet is assumed to include 700 bits, there will be (M=)142 time slots for writing packets between consecutive start-of-voice codes. (Here we have rounded off the number of time slots.)

Figure 3:
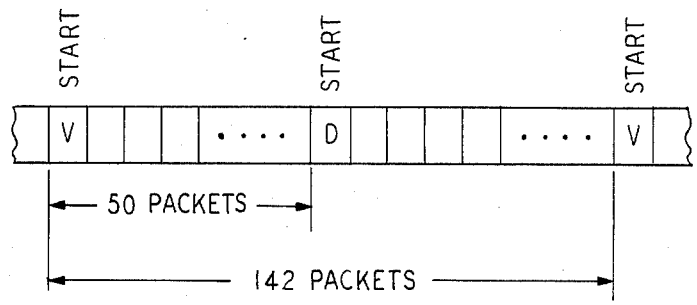
FIG. 3 illustrates an allocation of time in a cycle, the illustrative allocation being as between a voice packet subcycle and a data packet subcycle, which is useful in describing the principles of the invention.

Sixthly, referring to FIG. 3, the (M=)142 time slots in a cycle may be further allocated between, for example, a voice packet subcycle and a data packet subcycle in whatever way we choose. Assume that we will permit a maximum of 50 voice packets in a cycle. This would allow a minimum of 92 data packets in the cycle. Thus after a START=V code is written in a packet by the head station, 50 time slots are available for voice packets. Then a START=D code may be written in the 51-st packet by the head station after which 92 time slots are available for data packets. Responsive to the START=D code, the respective stations on the path are adapted to prohibit voice packets from the path (i.e. no voice packets are written until the next start-of-voice code is detected). Thus, the protocol involving the thus far defined start cycle signals (i.e. START=V, START=D, START=0) may be viewed as part of a method, responsive to which stations may be adapted to be switched on and off (i.e. enabled or disabled to transmit) depending on the traffic type. Clearly and as will shortly be made more clear, other start cycle codes could be used for still other types of traffic and/or for still other control reasons. In this way, the time slots in the cycle between two consecutive START=V codes can be divided or allocated among various traffic types in whatever proportion is required to service the various types of traffic.

Consider two issues associated with an embodiment of a system and a station including a protocol of a type aforedescribed. Firstly, when all voice slots are full (or busy), a new call should be reasonably allocated to a respective communications path as an old call drops off. Secondly, advantage can be taken of the silent interval that is commonly interlaced between talk spurts. For example, calls that return from a silent interval to a talking spurt may be rescheduled in such a way as to mitigate introducing excessive clipping of the speech signal.

Figure 4:
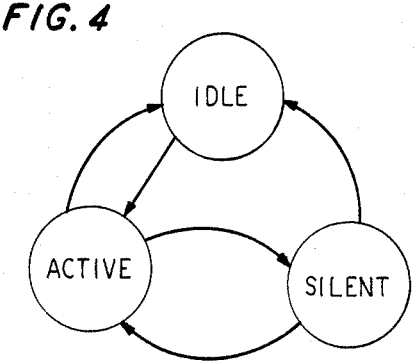
FIG. 4 illustrates a traffic source three-state diagram which is useful in describing the principles of the invention.

Toward solving those and other issues, refer to the three state diagram illustrated in FIG. 4 which will be useful in examining some of the dynamics of a traffic source, which in this case is assumed, for purposes of illustration only, to be a source generating a voice telephone call. Before a telephone conversation commences, we may regard the source as in an IDLE state. When the conversation commences, we assume that the source switches to an ACTIVE state. Until the end of the conversation the state of the source will generally switch regularly between the ACTIVE state and a SILENT state. At the end of the conversation, a transition to the IDLE state will occur from either the ACTIVE state or the SILENT state. Thus we have a three state source model including IDLE, ACTIVE and SILENT states. It follows then that the voice station at which the voice traffic source is located may be in either a NONIDLE state or an IDLE state. If the source is IDLE, no conversation is taking place. If the source is NONIDLE, the station may be either ACTIVE, e.g., a talk spurt could be in progress, or the station may be SILENT, e.g. a silent interval could be in progress so that the source is not generating traffic. A source that is ACTIVE is allocated a channel (here a time slot) and guaranteed access to the channel for the duration of the talk spurt. A source that is SILENT does not have a guaranteed channel but does have priority status over a source that is presently in the IDLE state and later becomes ACTIVE. A voice source, which is in the ACTIVE state and which has gained access to a path, will seize, i.e. write, a packet into the next empty time slot occurring after the START=V code is detected. An empty time slot can be determined by the contents of the busy access control field of the packet being read. For example, if the contents of the busy field include a logic one, the packet is busy; whereas, if the contents of the busy field include a logic zero, the packet is not busy, i.e., it is empty, and so may be written. After transmitting the voice packet in the empty time slot, which thereupon has its busy field overwritten with a logic one to indicate that the packet is not empty, i.e. is busy, the station does not transmit again until it reads another packet having its start cycle field set to START=V, i.e. through the use of the aforedescribed permit register the station generally writes one voice packet per cycle.

We now describe how our arrangement allows for writing more than one packet per cycle. The head station on each path, which head station also provides centralized control, is aware of the number of stations on its respective forward path that transmitted voice packets in the previous cycle, which number we call the number of active channels and which number is stored in an active channel (AC) register of the head station. If the number of active channels in the previous cycle is less than the maximum number allowed (50 in our example), the head station can start marking slots as "free" in the present cycle, e.g. by writing a new start cycle code, here a START=F, or free, code, in the start cycle field. Responsive thereto, SILENT and IDLE sources, which thereafter become ACTIVE, may compete for the free time slots subject to the aforementioned constraint, i.e. that priority is assumed to be given to ongoing calls. Accordingly, a new call is permitted to seize (or write) a free slot only if all prior calls, which were in a NONIDLE state and had a transition from the SILENT state to the ACTIVE state, were written on the path during the previous cycle. In order to communicate this information to the stations on the path, i.e. that there were empty "free" slot(s) in the previous cycle, the head station transmits the usual START=V code to the voice stations in the start cycle field. To communicate a contrary condition, i.e. that there were no empty "free" slots in the previous cycle, another new start cycle code, i.e. a START=W code, may be used. Thereby, and as will herein be clarified, in response to a START=F code, a station may be adapted to write more than one voice packet per cycle.

Now, more particularly, a station regularly reads the access control field of each packet passing the station. In our illustrative embodiment, the start cycle field of each packet on the forward path is written by the head station to contain one of a plurality of prefixed logic values which we call START codes such as START=V, START=F, START=D, START=W or START=zero. The plurality of START codes and their respective definitions, as assumed herein, are summarized as follows:

| | | DEFINTION |
|---|---|---|
| START= | D | Start of data subcycle. |
| | F | "Free" time slot available for use by voice stations. |
| | V | Start of voice subcycle and the previous voice subcycle contained emty, i.e. unused, free time slots. |

-continued

| | DEFINTION |
|---|---|
| W | Start of voice subcycle and the previous voice subcycle contained no empty free time slots, i.e. all the free slots were written (busy). |
| O | None of the above. |

Figure 5:
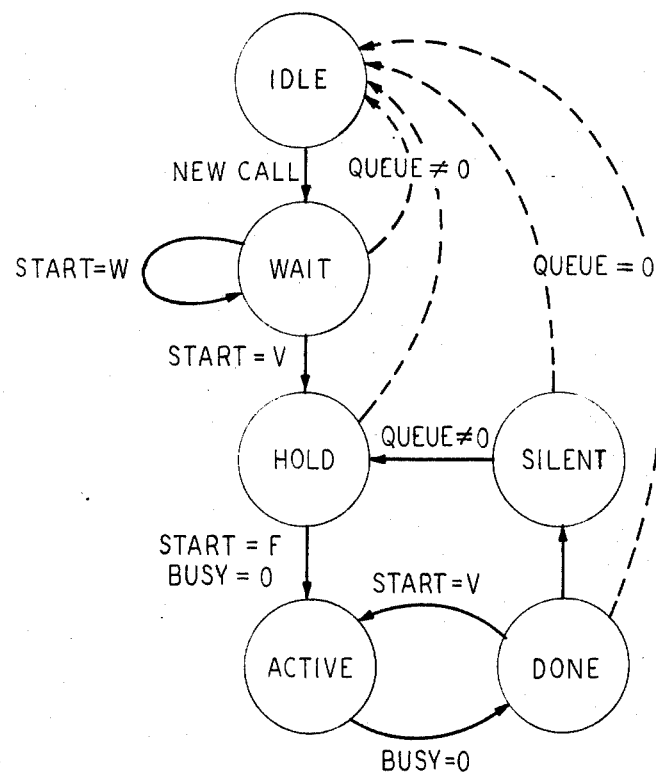
FIG. 5 illustrates a station multistate diagram which is useful in describing the principles of the invention.

Referring to FIG. 5, which relates to our protocol for any of the stations on a path, upon initiation of a new call, e.g., customer goes off-hook, the station state will change from IDLE to WAIT. On the one hand, upon reading a START=V code, the station state will change from WAIT to HOLD. On the other hand, upon reading START=W code, the station state will remain in the WAIT state. As priorly described, a START=W code indicates that there were no empty time slots marked START=F written in the previous voice subcycle. This event, in turn, implies that there may still be some station(s) with calls in a NONIDLE state, e.g. in a HOLD state, which calls are waiting to be serviced. In fact, under heavy traffic conditions a transition from the WAIT state to the HOLD state may be delayed for a number of cycles. Eventually, and even though its queue of packets to be transmitted is nonzero, if the station is not served within some predetermined time interval, a timeout could occur whereupon the station state may change from the WAIT state back to the IDLE state. Thereafter, the user may be returned a busy tone.

If, however, the station does switch to the HOLD state, the station can thereafter transfer to the ACTIVE state, for example, upon detecting a next packet with a START=F code and a BUSY=zero busy field for indicating an empty packet. While in the ACTIVE state, the station will write one packet on the path. The station will regularly transfer between the ACTIVE and DONE states. For example, at the start of each cycle, here, upon detecting a START=V code, a station in the DONE state moves to the ACTIVE state, whereafter and when a voice packet has been transmitted, the station may return to the DONE state. At some point, when in one of the DONE, SILENT or HOLD states, the conversation ends responsive to which the station will switch to the IDLE state.

Read circuitry of station 70-*i* includes circuitry for reading the busy field. Assume that station 70-*i* has a packet to transmit and that its permit register is set to a logic one. As is evident from FIG. 1, read coupler 20-*i* or (40-*i*) electrically precedes write coupler 30-*i* (or 50-*i*) and the two couplers may be a relatively short electrical distance apart. As should also be evident from FIG. 1, some finite time interval may be needed for determining whether or not the packet may be written onto the path, e.g., the determining action including interpreting the contents, or logic value, of the busy field of the packet being read. Experimentation has indicated that a relatively few bit time intervals allow adequate time for such a determination. Hence, in the instant embodiment, the DEAD, or (don't care), control field time interval is for allowing an adequate time interval during which read circuitry of station 70-*i* may interpret or determine the logic value of the busy bit of the packet being read.

On the one hand, if the contents of the busy field of the packet being read are detected as a logic zero, the packet to be written may be written through write coupler 30-*i* (or 50-*i*) onto path 10 (or 60). As was mentioned, the busy field is overwritten with a logic one. As was also mentioned, the station then may reset its permit register to a logic zero for indicating that the station may not transmit a packet.

On the other hand, if the contents of the busy field of the packet being read is detected as a logic one, the packet to be written is not then written. Indeed, if the packet were written, a collision would occur.

Even more particularly, and referencing FIG. 5, each station 70-*i* may include a respective queue counter, also referred to as a q-register, for counting the number of packets ready, i.e., in a queue for writing on a respective one of paths 10 and 60. If a station has no packets ready for writing on a path, the queue counter for that path could contain a count of zero, and the station enter or remain in an IDLE state with respect to that path. If a station has one or more packets for writing on the path, the queue counter could contain a nonzero count and the station could make a transition from the IDLE state to a WAIT state. (Recall that, while in the WAIT state, a station may timeout and return to the IDLE state, et cetera.)

Thus, in summary, in our collision avoiding arrangement, a station may transmit only when a read busy field is a logic zero. The permit register is set to a logic one in response to a START=V or START=F or START=D or START=W code. After having transmitted a packet, the station sets its permit register to a logic zero. If a station has a packet for transmission and if its permit register is a logic one, the station can transmit its packet and overwrite the busy field with a logic one. Thereafter, as packets flow over respective path 10 or path 60, the packets are read on the receive side of station 70-*i* through respective read coupler 20-*i* or 40-*i*. Each station 70-*i* can monitor the path for packets having, among other things, a destination address identifying the respective station as the addressed or called station. Upon detection of a destination address for identifying station 70-*i* as the addressed station, receive side read circuitry in station 70-*i* can thereafter read the packet and process the packet in whatever manner the station may have been programmed or adapted to do.

Figure 6:
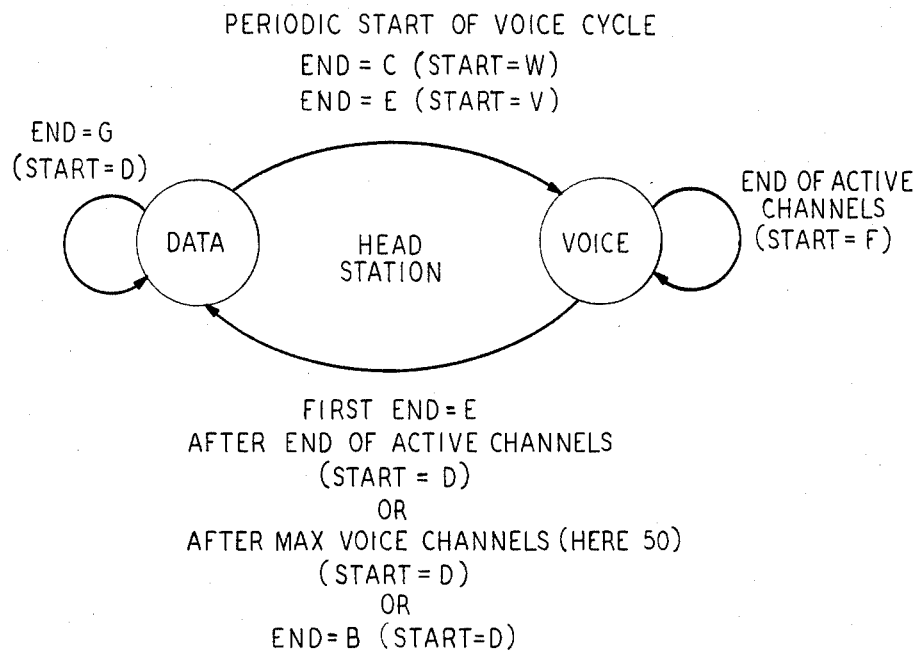
FIG. 6 illustrates a head station state diagram which is useful in describing the principles of the invention.

We now turn to a description of an illustrative embodiment of the principles of our invention with respect to a manner in which the head station and the last station may interact in controlling the access of voice and data stations to the communications paths. We start by describing the head station's protocol, a state diagram of which is shown in FIG. 6. Recall that in our example a cycle is assumed to be initiated periodically and at the rate of 100 cycles per second (i.e. voice samples are assumed to occur at 10 millisecond intervals). The head station switches to the VOICE state at the start of a voice cycle and, at the same time, writes (as is shown within parentheses in FIG. 6) either a START=V or a START=W code in the start cycle field of the next occurring packet on the forward path. Responsive to end cycle signals transmitted by the last station on the reverse path, which end cycle signals are hereinafter described, the head station counts the number of busy voice time slots (or active voice channels) on the forward path and stores the value in the "active channel" register. Recall that in our example the maximum number of voice time slots is 50. When the number of voice time slots in the present cycle exceed the number of voice time slots in the previous cycle (i.e. up to a maximum of 50), the head station writes a START=F start cycle code in each subsequent time slot packet. As priorly described, a START=F start cycle code in a time slot is a signal to the voice stations on the forward path that the slot is free and may be seized by a station waiting for service, e.g., by a station in the HOLD state as shown in FIG. 5. The station remains in the VOICE state until, as shown in FIG. 6, a transition from the VOICE state to the DATA state occurs.

We now describe stimuli responsive to which the head station switches from the VOICE state to the DATA state.

Firstly, the last station writes an end cycle field of a slot on the reverse path with an END=B code, responsive to detecting a START=V or START=W code in the start cycle field of an empty slot (BUSY=0) on the forward path. Since there is no voice traffic on the forward path, the head station upon detecting the END=B code may immediately switch from the VOICE state to the DATA state.

Secondly, the last station writes an end cycle field of a slot on the reverse path with an END=A code (for "acknowledgment"), responsive to detecting a START=V or START=W code in the start cycle field of a busy slot (BUSY=1) on the forward path. Thereafter the last station usually writes an END=zero code. However, as a first exception, the last station writes an END=E cycle code in the next time slot on the reverse path responsive to detecting the event that the immediately preceding slot on the forward path is empty. The last station repeats the step of writing the END=E code responsive to each empty slot on the forward path. Thus, by reading the end cycle field on the reverse path, the head station on the forward path can detect each empty slot during the previous cycle on the forward path and so count the number of slots on the forward path that were used for transmitting voice packets in the cycle. In particular, recall that the head station has stored a value in the active channel register which value identifies the number of busy voice time slots in the previous cycle. Thus the head station can be readily adapted to detect the first empty time slot on the forward path which occurs after active channel register value of voice time slots is exceeded. As shown in FIG. 6, responsive to detecting this condition, a transition may be made from the VOICE state to the DATA state.

Thirdly, a transition from the VOICE state to the DATA state can occur responsive to the maximum number of voice slots having been written on the forward path. (Recall in our example the maximum number is 50.)

The temporally first of the above three conditions to be detected will trigger the transition from the VOICE state to the DATA state. Upon transition to the DATA state, the head station writes a START=D code in the start cycle field of the next packet on the forward path. Responsive thereto, each station on the forward path thereafter may compete for an empty data time slot and, finding one, transmit a data packet.

In order to transmit more than one data packet in a data subcycle, our arrangement includes the following protocol. The last station reads the packets on the forward path. Upon detecting an empty data time slot, the last station writes an END=G code in the end cycle field of the next packet written on the reverse path. Upon detecting the END=G code, the head station writes a START=D code on the forward path to enable each station to compete for an empty data time slot. The protocol repeats until the commencement of the next voice subcycle.

We now describe the stimuli responsive to which the head station switches from the DATA state to the VOICE state. From the foregoing, it should be clear that a start-of-voice code is automatically and regularly written on the forward path by the head station, in our example at 10 millisecond intervals. As to determining which start-of-voice code is to be written, the head station reads the end cycle field of each packet on the reverse path. Firstly, if an END=E code is detected in the end cycle field then one or more free slots (i.e. slots with START=F) were unused (i.e. were empty or not busy) in the previous voice cycle. Accordingly, a START=V code is written in the next packet on the forward path and the head station switches to the VOICE state. Secondly, if an END=C code is detected in the end cycle field then all slots with START=F were written in the previous voice cycle, i.e. in our example, 50 voice packets were written in the previous voice subcycle, which in turn means there may be at least one voice packet waiting for access to the path. Accordingly, a START=W code is written in the next packet on the forward path and the head station switches to the VOICE state.

As should be eminently clear from the foregoing description, one role of the last station is to sense and detect various conditions at the electrical end of the forward path and to communicate those conditions to the head station for appropriate controller action. Our illustrative embodiment for communicating the conditions includes using the end cycle field of packets on the reverse path. The plurality of END codes and their respective definitions as assumed herein, are summarized as follows:

| | | Definition |
|---|---|---|
| END= | A | Written in response to receiving a START=V or START=W code on the forward path, i.e. at the start of a voice subcycle. |
| | B | Written instead of an END=A when there is no voice traffic on the forward path. |
| | C | Written in response to receiving a START=D code on the forward path when in a voice subcycle i.e., upon detecting the start of a data subcycle. |
| | E | Written in response to receiving an empty slot in the voice subcycle, except when the empty slot is the first slot in the voice subcycle. |
| | G | written in response to receiving an empty time slot in the data subcycle. |
| | O | None of the above. |

Figure 7:
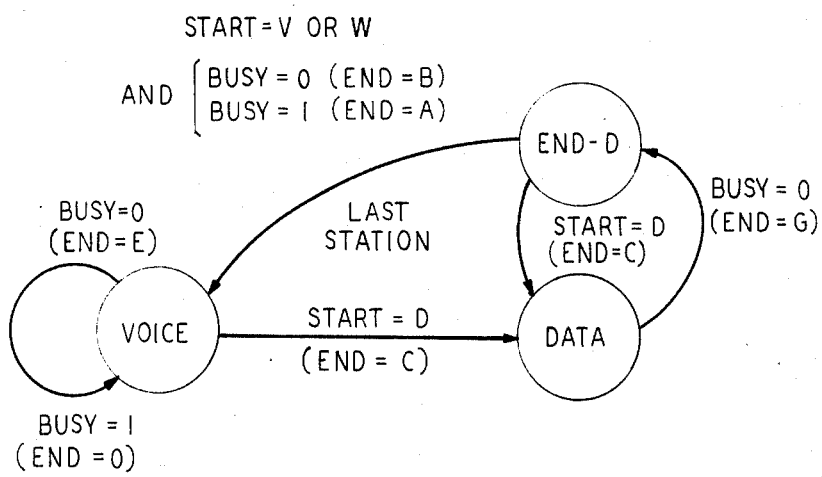
FIG. 7 illustrates a last station state diagram which is useful in describing the principles of the invention.

To explain how the last station may carry out its role in our illustrative embodiment, refer to FIG. 7, where it is shown that the last station may be in one of three different states.

Firstly, assume that the last station is in the END-D state and assume that a START=V or START=W start cycle code is detected on the forward path. On the one hand, if there is a call in progress, the first slot on the forward path, i.e., the slot having the aforementioned start cycle code, would be busy, i.e. the contents of its busy field would include a logic one (BUSY=1). In response thereto the last station will transfer to a VOICE state and write (as is shown within parentheses in FIG. 7) an END=A code in the end cycle field of the next packet on the reverse path. On the other hand, if there is no call in progress, the first slot on the forward path would be empty, i.e. its busy field would have a logic zero (BUSY=0). In response thereto the last station will transfer to the VOICE state and write an END=B code in the end cycle field of the next packet on the reverse path. In either case, the last station will remain in the VOICE state until a START=D code is detected in a time slot on the forward path. Upon detecting the START=D code, the last station will write an END=C code in the end cycle field of the next packet on the reverse path and transfer to the DATA state. While in the VOICE state, on the one hand, upon detection of a busy packet on the forward path, i.e. a packet with a BUSY=1 busy field, the last station will write an END=0 end cycle code in the end cycle field of the next packet on the reverse path. On the other hand, and as mentioned, upon detection of an empty packet on the forward path, i.e. a packet with BUSY=0 busy field, the last station will write an END=E code in the end cycle field of the next packet on the reverse path.

Secondly, in the above case (i.e., the case while in the END-D state where there is no call in progress when the start cycle code is detected), the last station would write an END=B code rather than an END=A code in the end cycle field and transfer to the VOICE state. Since the END=B code means that there is no voice traffic on the forward path, the head station upon detecting the END=B code may immediately transfer to a data subcycle rather than wait for the next packet which, as priorly described, would include an END=E code. Accordingly, in response to an END=B code, the head station writes a START=D code in the start cycle field of the next packet on the forward path. Upon detecting the START=D code on the forward path, the last station transfers from VOICE state to the DATA state and writes an END=C code in the end cycle field of the next packet on the reverse path.

Thirdly, while in the DATA state, the last station will transfer to the END-D state upon detecting an empty slot on the forward path. The last station will also write an END=G code in the end cycle field of the next packet on the reverse path. The head station upon detecting an END=G code may write a START=D code for initiating a new data subcycle on the forward path, thereby permitting stations to transmit more than one data packet in a cycle.

Figure 8:
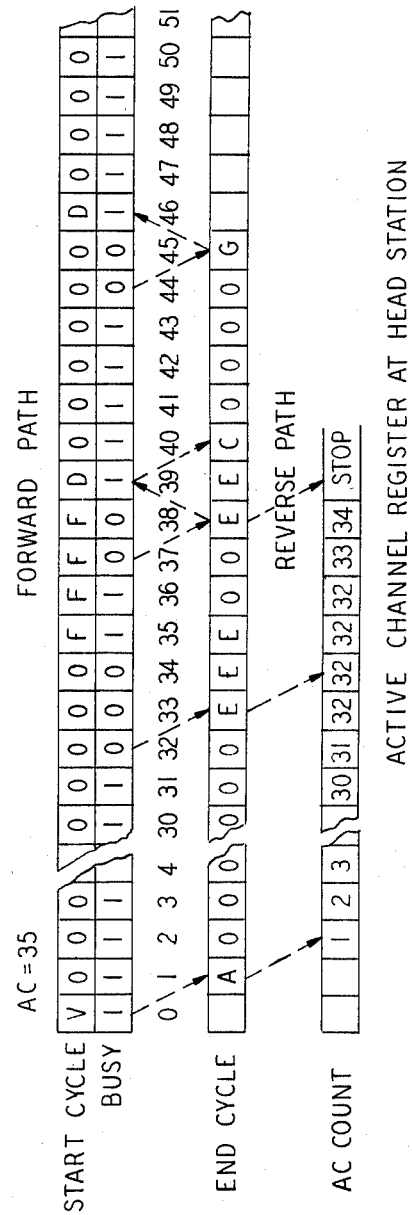
FIG. 8 illustrates various packet control subfields on the forward path and the reverse path of the system in FIG. 1, which is useful in describing a numerical example illustrating the principles of the invention.

FIG. 8 illustrates through use of a numerical example what may be a typical sequence of events occurring on the forward and reverse paths of our illustrative system. In our example, we assume two unidirectional and oppositely directed paths, each operating at 10 megabits per second. We also assume 700-bit packets, a cycle interval of 142 slots, and up to a maximum of 50 slots dedicated to voice traffic. Let us further assume that at one instant in time the active channel (AC) register has a value of 35 stored therein that is, in the previous cycle there were 35 active voice slots. The head station writes a START=V code in time slot 0. We assume that during the present cycle, three conversations were discontinued so that now slots 32, 33 and 34 are empty i.e. BUSY=0 codes appear therein. Responsive to detecting the empty slots on the forward path, the last station writes an END=E code in the next slots on the reverse path. After 35 slots have been transmitted the head station writes a START=F code in slots beginning with slot 35 to indicate that the free slots may be used by calls waiting in the HOLD state of FIG. 5. From FIG. 8, we see that two new voice slots have been written, i.e. forward path slots 35 and 36, and that slot 37 is empty. We conclude that there are now no unserved calls in the HOLD state. Upon detecting the first empty slot at slot 37, the last station will write an END=E code in the end field of the next slot on the reverse path. The last station will continue to write END=E codes until the head station reads an END=E code and determines that the voice subcycle may now be discontinued. As shown, we assume this takes the time equivalent of two slots to occur and thus a START=D code is written in slot 39 for enabling the data stations to seize slots, i.e. to write data packets. Upon detecting the START=D code on the forward path, the last station writes an END=C code in the end cycle field of the next packet on the reverse path. Also, when the last station detects an empty slot while in the DATA state, it writes an END=G code in the next packet on the reverse path. Two slots later, e.g. at slot 64, the head station detects the END=G code and, in response thereto, writes a START=D code at slot 46 for beginning another data subcycle. Data subcycles can recur for the remainder of the cycle, here until slot 142 is reached, at which point the head station writes a START=V code which initiates a new cycle. Notice that by counting the number of packets on the reverse path in which an END=E code occurs, the head station is able to determine that the number of active voice channels, has decreased from 35 to 34 which decrease corresponds to the termination of three old voice calls and the initiation of two new voice calls.

Although the invention has been described and illustrated in detail, it is to be understood that same is by way of illustration and example only. For brevity, some alternative modifications of the principles of the invention have been disclosed. Still other modifications of the principles of the invention will occur to those skilled in the art, e.g., logic values could be inverted or access control field could be relocated. Accordingly, the invention is not to be considered limited by the embodiment(s) shown and thus the spirit and scope of the invention are limited only by the appended claims.

What is claimed is:

1. A method for controlling digital signals in a communications system, said system including a plurality of stations, at least two of said stations being coupled to first and second separate, independent, unidirectional and oppositely directed signal paths, said method including the steps of writing signals on either of said paths and reading signals from either of said paths and characterized in that said method further comprises the step of:

writing a first start cycle code in a predetermined field of a packet on a forward one of said paths, said first start cycle code being written by a head station and said first start cycle code for identifying a first type of traffic which may be written by a station down the line from said head station relative to said forward path in a packet on said forward path.

2. The method defined in claim 1 further comprising the steps of:

reading said first start cycle code by a first station on said forward path and down the line from said head station relative to said forward path; and responsive to said first read start cycle code, initializing said first station for writing said first type of traffic identified by said start cycle code.

3. The method defined in claim 1 further comprising the step of:

overwriting a busy control field of a first packet on said forward path with a signal for indicating that a station has written a second packet on said forward path.

4. The method defined in claim 2 further comprising the steps of:

reading a busy control field of a first packet on said forward path; and responsive to said read busy control field indicating that said forward path is not busy and responsive to said station having a second packet of said first traffic type to transmit, writing said second packet on said forward path, said second written packet thereby overwriting any packet on said forward path.

5. The method defined in claim 2 further comprising the steps of:

reading a busy control field of a first packet on said forward path; and responsive to said read busy control field indicating that said forward path is busy, entering a HOLD state until another read busy control field indicates that said forward path is not busy.

6. The method defined in claim 2 further comprising the steps of:

reading a busy control field of a first packet on said forward path; and responsive to said read busy control field indicating that said forward path is not busy, writing an end cycle code in a packet on a reverse one of said paths.

7. The method defined in claim 6 further comprising the steps of:

reading said end cycle code packet on said reverse path and responsive to said read end cycle code, writing a second start cycle code in a packet on said forward path, said second start cycle code being written by said head station and said second start cycle code including a start cycle field responsive to which a station on said forward path and down the line from said head station relative to said forward path may be initialized to transmit a second type of traffic packet.

8. The method defined in claim 2 further comprising the step of:

responsive to said first read start cycle code, writing an end cycle code in a packet on a reverse one of said paths.

9. A communications system including a plurality of stations, at least two of said stations being coupled to first and second separate independent, unidirectional and oppositely directed signal paths, means for writing signals on either of said paths and means for reading signals from either of said paths and characterized in that said system further comprising:

means for writing a first start cycle code in a predetermined field of a packet on a forward one of said paths, said first start cycle code being written by a head station and said first start cycle code for identifying a first type of traffic which may be written by a station down the line from said head station relative to said forward path in a packet on said forward path.

10. The system defined in claim 9 further comprising:

means for reading said first start cycle code by a first station down the line from said head station relative to said forward path on said forward path; and means, responsive to said first read start cycle code, for initializing said first station for writing said first type of traffic identified by said start cycle code.

11. The system defined in claim 9 further comprising means for overwriting a busy control field of a first packet on said forward path with a signal for indicating that a station has written a second packet on said forward path.

12. The system defined in claim 10 further comprising:

means for reading a busy control field of a first packet on said forward path; and means, responsive to said read busy control field indicating that said forward path is not busy and responsive to said station having a second packet of said first type to transmit, for writing said second packet on said forward path, said second written packet thereby overwriting any packet on said forward path.

13. The system defined in claim 10 further comprising:

means for reading a busy control field of a first packet on said forward path; and means, responsive to said read busy control field indicating that said forward path is busy, for entering a HOLD state until another read busy control field indicates that said forward path is not busy.

14. The system defined in claim 10 further comprising:

means for reading a busy control field of a first packet on said forward path; and means, responsive to said read busy control field indicating that said forward path is not busy, for writing an end cycle code in a packet on a reverse one of said paths.

15. The system defined in claim 14 further comprising:

means for reading said end cycle code packet on said reverse path and means, responsive to said read end cycle code, for writing a second start cycle code in a packet on said forward path, said second start cycle code being written by said head station and said second start cycle code including a start cycle field responsive to which a station on said forward path may be initialized to transmit a second type of traffic packet.

16. The system defined in claim 10 further comprising:

means, responsive to said first start cycle code, for writing an end cycle code in a packet on a reverse one of said paths.

17. Station apparatus for controlling digital signals in a communication system, said station adapted to be coupled to first and second separate, independent, unidirectional and oppositely directed signal paths, said station including means for writing signals on either of said paths and means for reading signals from either of said paths and characterized in that said station further comprises:

means for writing a first start cycle code in a predetermined field of a packet on a forward one of said paths, said first start cycle code being written by a head station and said first start cycle code for identifying a first type of traffic which may be written by a station along said forward path and down the line from said head station relative to said forward path in a packet on said forward path.

18. The station defined in claim 17 further comprising:

means for reading said first start cycle code on said forward path; and means, responsive to said first read start cycle code, initializing said station for writing said type of traffic identified by said start cycle code.

19. The station defined in claim 17 further comprising:

means for overwriting a busy control field of a first packet on said forward path with a signal for indicating that said station has written a second packet on said forward path.

20. The station defined in claim 18 further comprising:

means for reading a busy control field of a first packet on said forward path; and means, responsive to said read busy control field indicating that said forward path is not busy and responsive to said station having a second packet of said first traffic type to transmit, for writing said second packet on said forward path, said second written packet thereby overwriting any packet on said forward path.

21. The station defined in claim 18 further comprising:

means for reading a busy control field of a first packet on said forward path; and means, responsive to said read busy control field indicating that said forward path is busy, for entering a HOLD state until another read busy control field indicates that said forward path is not busy.

22. The station defined in claim 18 further comprising:

means for reading a busy control field of a first packet on said forward path; and means, responsive to said read busy control field indicating that said forward path is not busy, for writing an end cycle code in a packet on a reverse one of said paths, said end cycle code being written by a last station on said forward path.

23. The station defined in claim 22 further comprising:

head station means for reading said end cycle code packet on said reverse path, head station means, responsive to said read end cycle code, for writing a second start cycle code in a packet on said forward path, said second start cycle code being written by said head station and said second start cycle code including a start cycle field responsive to which a station on said forward path may be initialized to transmit a second type of traffic packet.

24. The station defined in claim 18 further comprising:

means, responsive to said first read start cycle code, for writing an end cycle code in a packet on a reverse one of said paths, said end cycle code being written by a last station on said forward path.

* * * * *

UNITED STATES PATENT AND TRADEMARK OFFICE
CERTIFICATE OF CORRECTION

PATENT NO. : 4,581,735

DATED : April 8, 1986

INVENTOR(S) : Lois E. Flamm and John O. Limb

It is certified that error appears in the above-identified patent and that said Letters Patent is hereby corrected as shown below:

In the Abstract, line 13, "bus" should read --busy--. Column 2, line 20, "read" should read --reads--. Column 3, line 63, "couplers" should read --coupler--. Column 13, line 32, "64" should read --46--.

Signed and Sealed this

Twenty-seventh Day of January, 1987

Attest:

DONALD J. QUIGG

Attesting Officer    Commissioner of Patents and Trademarks